(12) United States Patent
Jakob et al.

(10) Patent No.: US 10,662,995 B2
(45) Date of Patent: May 26, 2020

(54) SUPPORTING WASHER

(71) Applicant: MLT MINET LACING TECHNOLOGY, Saint-Chamond (FR)

(72) Inventors: Horst Jakob, Deaux (FR); Bernard Tavernier, Le Chambon Feugerolles (FR)

(73) Assignee: MLT MINET LACING TECHNOLOGY, Saint-Chamond (FR)

( * ) Notice: Subject to any disclaimer, the term of this patent is extended or adjusted under 35 U.S.C. 154(b) by 0 days.

(21) Appl. No.: 16/204,460

(22) Filed: Nov. 29, 2018

(65) Prior Publication Data

US 2019/0093699 A1 Mar. 28, 2019

Related U.S. Application Data

(63) Continuation of application No. PCT/FR2017/051419, filed on Jun. 6, 2017.

(51) Int. Cl.
*F16B 43/00* (2006.01)
*F16G 3/08* (2006.01)

(52) U.S. Cl.
CPC ............... *F16B 43/00* (2013.01); *F16G 3/08* (2013.01)

(58) Field of Classification Search
CPC .......... F16B 21/18; F16B 39/10; F16B 39/14; F16B 39/24; F16B 39/34; F16B 39/36; F16B 43/00; F16B 43/002; F16G 3/08; Y10S 411/957
USPC ................................. 411/163, 337, 531, 538
See application file for complete search history.

(56) References Cited

U.S. PATENT DOCUMENTS

| | | | | |
|---|---|---|---|---|
| 1,382,799 | A | | 6/1921 | Purple |
| 1,911,384 | A | * | 5/1933 | Olson ..................... F16B 39/24 411/155 |
| 1,963,028 | A | * | 6/1934 | Olson ..................... F16B 39/24 411/154 |
| 2,770,277 | A | * | 11/1956 | Poupitch ................ F16B 39/26 411/134 |
| 3,258,048 | A | * | 6/1966 | Schmidt .................. F16B 39/24 411/134 |
| 3,259,383 | A | * | 7/1966 | Johnson .................. F16B 43/00 267/161 |
| 3,926,237 | A | * | 12/1975 | Enders .................. F16B 39/282 411/135 |
| 4,793,757 | A | * | 12/1988 | Peterson ................. F16B 43/00 411/353 |
| 4,802,785 | A | * | 2/1989 | Richards ............... F16B 7/0413 403/27 |

(Continued)

FOREIGN PATENT DOCUMENTS

FR 1108983 1/1956
FR 2 803 836 A1 7/2001

OTHER PUBLICATIONS

International Search Report for International patent application PCT/FR2017/051419, dated Oct. 24, 2017.

*Primary Examiner* — Roberta S Delisle
(74) *Attorney, Agent, or Firm* — Burris Law, PLLC

(57) ABSTRACT

The present disclosure provides a washer having a generally circular shape and is used for supporting a screw head. The shank of the screw penetrates the central hole of the washer. When viewed from a planar perspective, the outer edges of the washer have a sinusoidal shape with depressions and elevations.

5 Claims, 7 Drawing Sheets

(56) References Cited

U.S. PATENT DOCUMENTS

| | | | | |
|---|---|---|---|---|
| 6,039,525 | A | * | 3/2000 | Johnson ................ F16B 41/002 |
| | | | | 411/353 |
| D747,183 | S | * | 1/2016 | Davidson ...................... D8/397 |
| 2005/0089385 | A1 | * | 4/2005 | Lin .......................... F16B 39/24 |
| | | | | 411/154 |
| 2009/0064454 | A1 | * | 3/2009 | Anderson ................ B61D 3/18 |
| | | | | 16/2.1 |
| 2010/0239390 | A1 | * | 9/2010 | Junkers ................ B25B 21/002 |
| | | | | 411/532 |
| 2010/0326006 | A1 | | 12/2010 | Yaros |
| 2014/0321946 | A1 | * | 10/2014 | Thomas .................. F16B 31/02 |
| | | | | 411/432 |
| 2019/0120275 | A1 | * | 4/2019 | Junkers .................. B25B 21/00 |

\* cited by examiner

SUPPORTING WASHER

CROSS-REFERENCE TO RELATED APPLICATIONS

This application is a continuation of International Application No. PCT/FR2017/051419, filed on Jun. 6, 2017, which claims priority to and the benefit of FR 16/00917 filed on Jun. 7, 2016. The disclosures of the above applications are incorporated herein by reference.

FIELD

The present disclosure relates to a supporting washer for a screwed or riveted assembly for a conveyor belt junction element.

BACKGROUND

The statements in this section merely provide background information related to the present disclosure and may not constitute prior art.

Supporting washers made of metal or synthetic material have been known for a long time, having at their center a hole intended to allow the stem of a connecting element comprising a head to pass through, for example a screw or a rivet, while still retaining the head of said connecting element, the dimension of the hole being greater than or equal to that of the stem and less than that of the head. These known washers can comprise a bowl around the central hole for the purpose of housing the head of the connecting element.

These washers increase the surface on which the screw bears, preventing, in this way, the screw head from damaging the material placed under it in the case where a supporting washer is not used, by distributing the force exerted by the screw over a larger surface.

Disadvantages occur only rarely in the case where the material placed under the washer is a metal, but occur more often in the case where this material is wood, a synthetic material, or an elastomer. Indeed, the circumferential edge of known supporting washers is a surface perpendicular to the general plane of known washers, the lower edge of the circumferential edge of known washers, formed by the meeting between said surface perpendicular to the general plane of said known washers and the lower surface plane of said known washers, exerts a shearing action in the material on which the known washers bear. This shearing is barely discernible of even non-existent, in the case where this material is a hard material, for example a metal material, but it occurs as soon as the screw is tightened in the case where this material is a synthetic material, and even more in the case where this material is an elastomer. As mentioned hereinabove, this shearing can occur as soon as the screw is tightened or as soon as the rivet is applied, but even more when the assembly assembled by means of the connecting element, using said known supporting washers, is subjected to forces being exerted in varied directions. An example of this is given in the field of elastomer junctions such as used to connect the ends of a conveyor belt. These reinforced elastomer junctions are fixed at the ends of the conveyor belt using screws or rivets that successively pass through the upper plate of these junctions, the ends of the conveyor belt and the lower plate of these junctions.

French Patent No. 2 803 836 shows this application. Note that in the case of this patent, inserts embedded in the elastomer material of the plates of the junction are used to receive the screw heads. But, during manufacture, the setting up, in particular that of the upper insert forming a bowl for the purpose of receiving the screw head, is expensive, and attempts have been made to use a supporting washer as a replacement for the upper insert. But disadvantages, already described, were encountered with the known supporting washers. This led to the utility of creating new supporting washers, able to eliminate these disadvantages.

In the same application for reinforced elastomer junctions intended to connect the ends of a conveyor belt, this shearing is even more accentuated due to the use, in the case of certain conveyor belts, of scrapers formed of blades applied against the surface of the conveyor belt in motion, these blades being intended to remove the debris of the transported material remaining on said surface of the conveyor belt, for example coal or ore. These blades encounter the supporting washers and accentuate the shearing effect described hereinabove, all the more so that these blades are often provided with tungsten steel edges, which are particularly aggressive.

SUMMARY

The present disclosure provides supporting washers that inhibit shearing.

According to a technical aspect, the present disclosure relates to a supporting washer for a screwed or riveted assembly, in particular for a conveyor belt junction element, formed from a metal or synthetic material part of an approximately planar shape having at its center a hole intended for the passage of a connecting element of the rivet or screw type comprising a stem and a head, such as for example, a screw provided with a male thread or a female thread, of which the head, during the use of the washer, is supporting the edges of the central hole of the washer, remarkable in that the outer edge or edges of the part forming the washer have, seen from a planar perspective, a linear shape that increases the length of the outer edge of the washer with respect to that of a washer of which the outer edge is strictly circular.

This is particularity due to the fact that the outer edges of the supporting washers are not circular but have, seen from a planar perspective, linear shapes that substantially increase the length of the outer edge, or of the lower edge, of the washer with respect to a linear shape that is strictly circular such as that of the edge of a known supporting washer.

The increase in the length has for effect to reduce the impact of shearing exerted on the material placed under the washer, for example that of a conveyor belt junction.

However, it should be understood that the washer claimed by the present disclosure can be applied in applications other than junctions for conveyor belts, such as for example, when, due to its use, the washer can bite in the underlying material, under the effect of tilting, vibrations, or an excessively tight force.

Note that the edges of the central hole of the washer can be chamfered, or deformed, so that the upper surface of the head is flush, at the end of screwing or riveting, with the upper surface of the washer adjacent to the central hole.

Another technical particularity of the present disclosure is that the outer edge has, seen from a planar perspective, sinuosities comprising elevations and depressions, the elevations being farther from the geometric center of the washer and the depressions being closer to the geometric center of the washer.

Another particularity of the washers according to the present disclosure is that the zones of the edge of the washer that are the farthest from the geometric center of the washer comprise a rounded edge on the lower edge. In other terms, according to this characteristic, the supporting washer comprises a lower edge, formed by the meeting between the lower surface of the washer and the outer edge of the washer, said lower edge having a rounded edge, at least in the elevation portions of the sinuosities of the outer edge of the washer located the farthest from the geometric center of the washer.

These rounded portions make it possible, during the use of the washer, to further reduce the effect of any shearing. Although tests have shown that this rounded edge is especially useful with regards to the portions of the lower edge that are farthest from the geometric center of the washer, it is also possible that the entire lower edge of the edge of the washer be provided with such a rounded edge.

The washers according to the present disclosure, can have another particularity that is useful with regards to the application to the reinforced elastomer junctions used to connect the two ends of a conveyor belt.

Indeed, installations that use conveyor belts intended for transporting bulk materials, such as coal, ore and other materials, generally comprise scrapers. These scrapers tend to catch on the upper edge of the outer edge of the washer and pull off the washer along with the screw or the rivet. Consequences for such an incident includes the obligation to carry out a repair, which therefore also involves substantial losses in operating time.

The present disclosure advantageously provides the upper surface of the washers with a conicity starting from the outer edge of the bowl that surrounds the central hole and terminates at the outer edge of the washer, this conicity resulting in a progressive tapering of the washer from the central zone to the outer edge of the washer. In other terms, according to this characteristic, the upper surface of the washer has a conical surface/shape starting substantially from the edge of the bowl surrounding the central hole or from a circular surface surrounding the central hole of the washer and terminating at the outer edge of the washer, this conical surface driving a progressive tapering of the washer such that the upper edge of the outer edge of the washer is substantially flush with the surface whereon the washer is placed when the washer has been applied by riveting or screwing.

As such the scrapers do not risk encountering the upper edge of the outer edge of the washer, this edge being flush with the surface of the underlying junction, once the washer is installed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
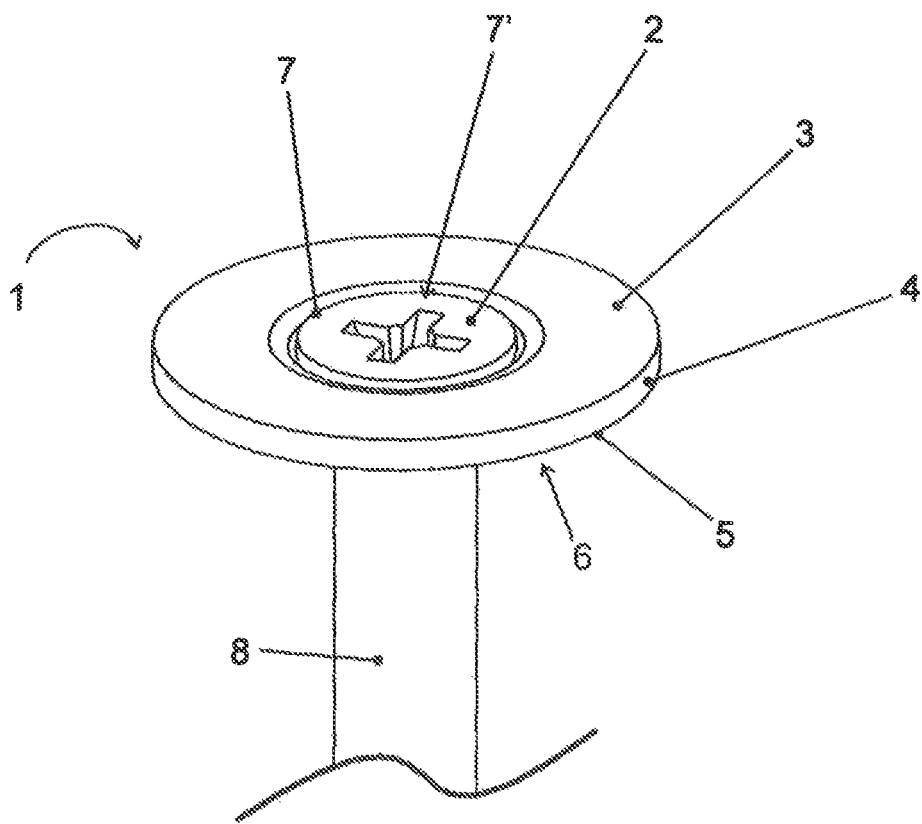
FIG. 1 shows a supporting washer according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The supporting washer 1 of FIG. 1, according to the prior art, consists of a part 3 with a round shape, the part 3 comprising a circumferential edge 4, a lower edge 5, a lower planar surface 6, a central hole 7' of which the edges form a bowl 7 intended to receive a screw head 2, the stem 8 of the screw passing through the central hole 7'.

Figure 2:
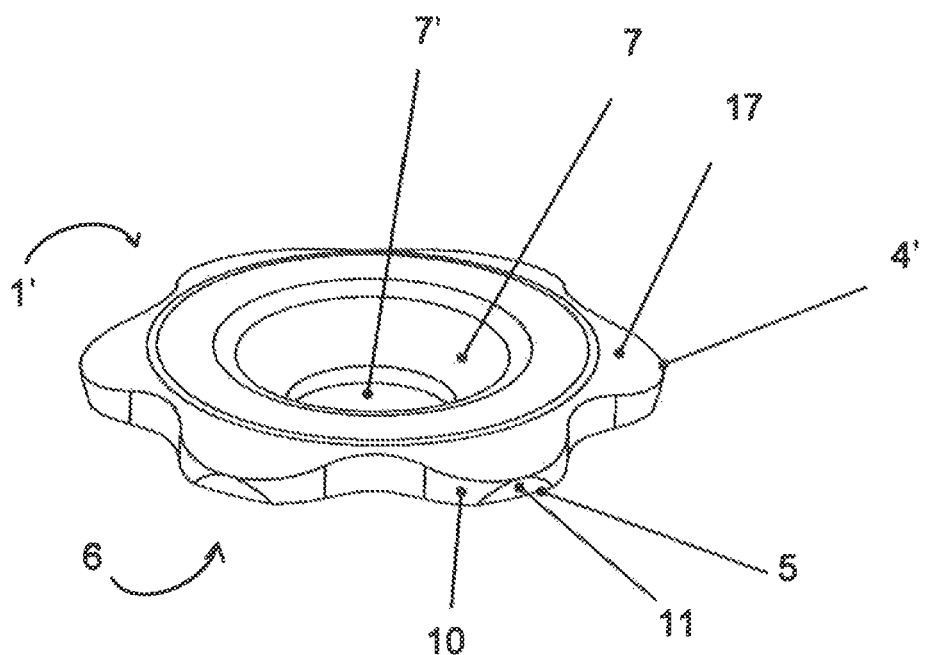
FIG. 2 shows one form of the washer according to the present disclosure.
Figure 3:
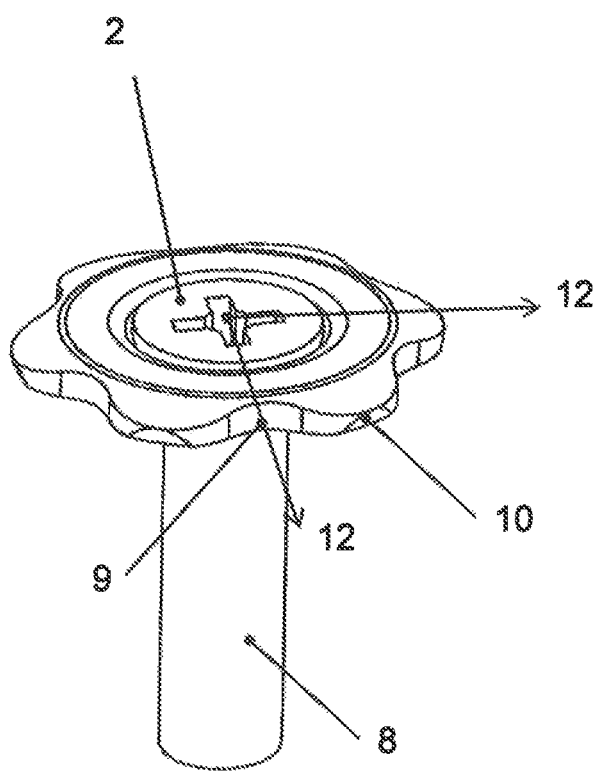
FIG. 3 shows the washer of FIG. 2 comprising a screw of which the stem passes through the central hole of the washer.

The supporting washer 1' of FIG. 2, according to one form of the present disclosure, comprises a part with a generally round shape comprising an outer edge 4', a central hole 7', a bowl 7, a lower edge 5, and a lower surface 6. However, note that the outer edge 4' has, seen from a planar perspective, a sinusoidal shape having elevations 10 and depressions 9 (FIG. 3). The upper surface 17 is conical and the elevations 10 comprise, at their end, a rounded edge 11, this rounded edge 11 being created on the lower edge 5.

The assembly shown in FIG. 3 is formed from a washer 1' and a screw.

As shown in FIG. 3, the assembly includes the screw head 2, the screw stem 8, the depressions 9 and the elevations 10. Although the supporting washer 1' is illustrated as having six (6) depressions 9 and elevations 10, it should be understood that any number of depressions 9 and elevations 10 may be employed while remaining within the scope of the present disclosure. The depressions 9 and the elevations 10 are symmetrical with respect to a virtual radius 12 of the washer 1'. This means that the washer 1' has a symmetry with respect to an axis carried by its virtual radius 12.

Figure 4:
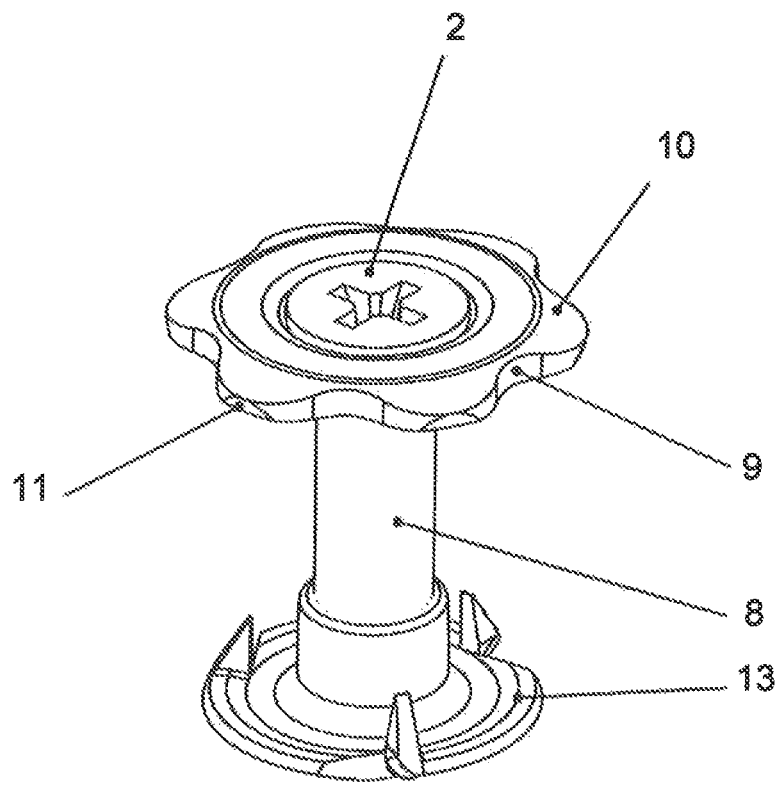
FIG. 4 shows the washer according to FIG. 3, applied to a screw of which the stem passes through the central hole of the washer, which is screwed onto an insert.

FIG. 4 shows the same assembly as that of FIG. 3, with the same numerical references, the screw stem 8 being screwed on an insert 13.

Figure 5:
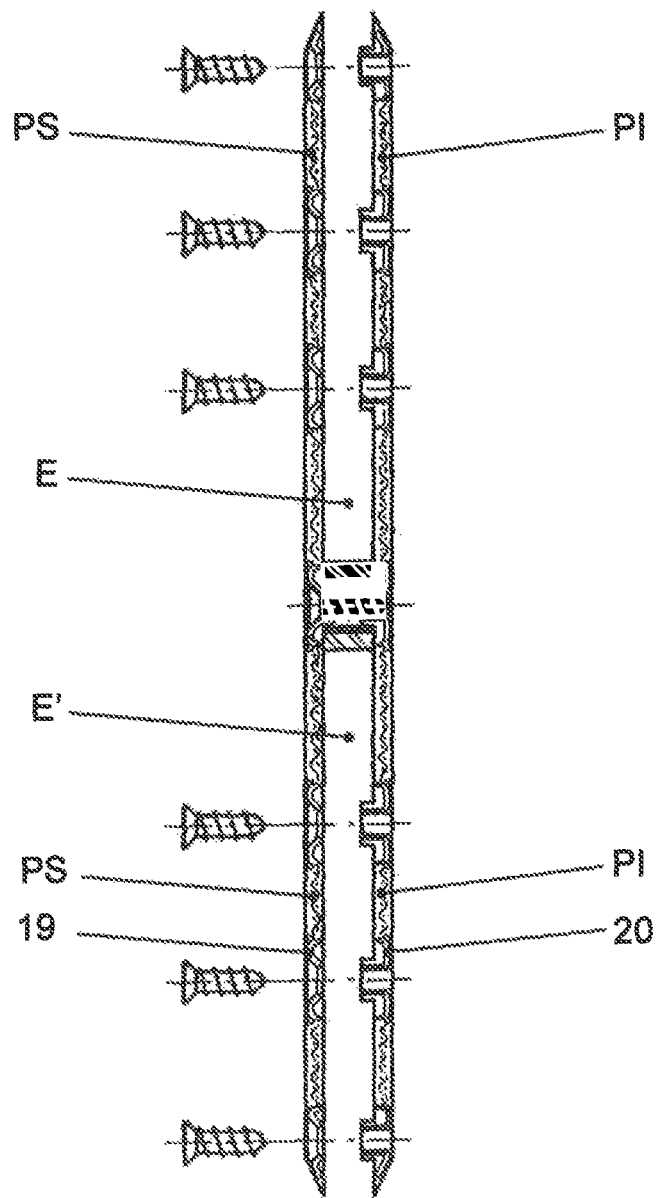
FIG. 5 shows an example of a screw connection according to the prior art.

FIG. 5 shows a cross-section of one example of a screwed assembly of the upper plate and of the lower plate of a junction for a conveyor belt of the prior art, according to French Patent No. 2 803 836. Note the female inserts 19 and the male inserts 20 respectively incorporated into the upper plate PS and into the lower plate PI, these plates surrounding the end E, of the conveyor belt.

Figure 6:
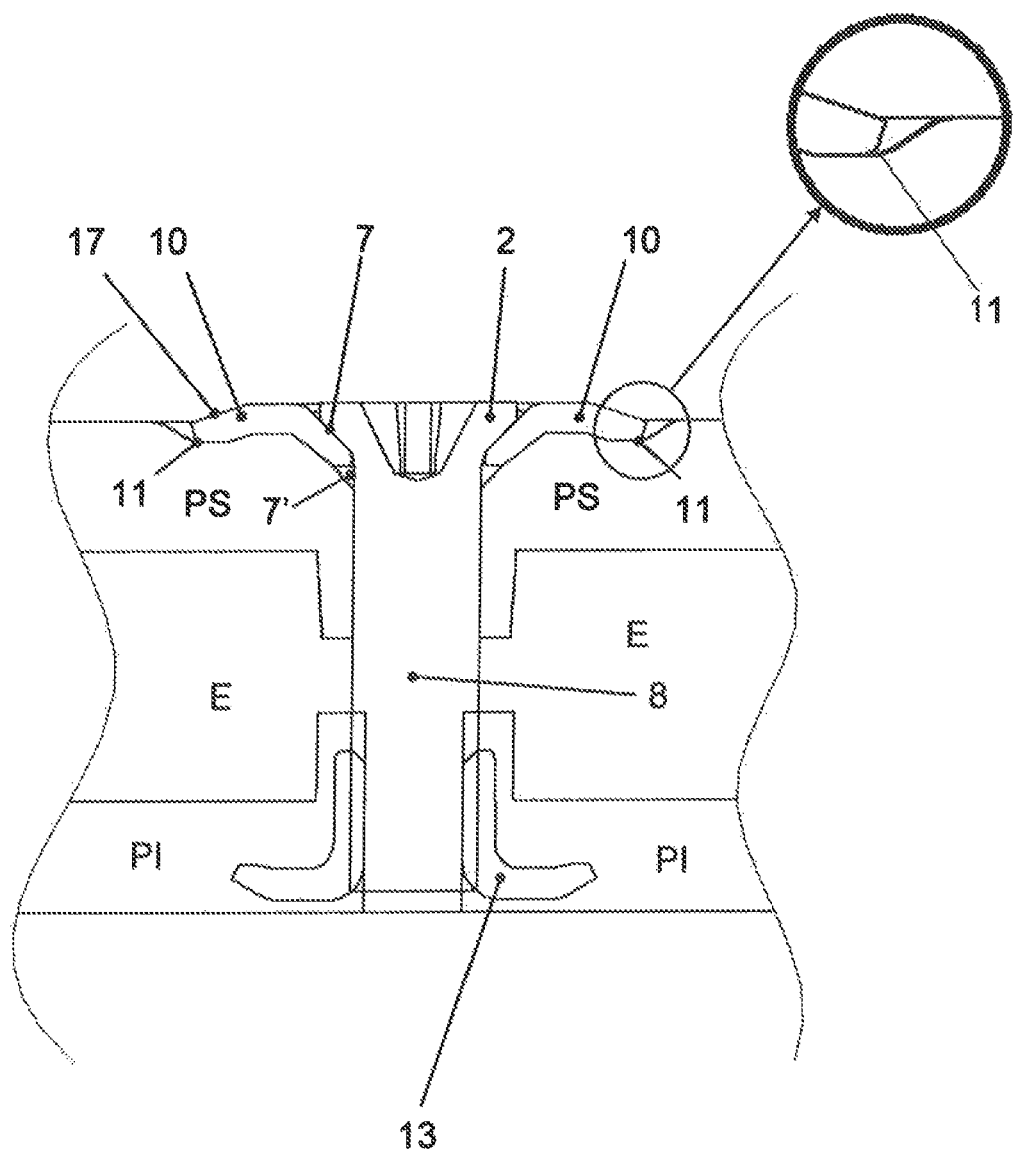
FIG. 6 shows a cross-section of a screw connection using a washer according to the present disclosure, applied to a junction that connects the ends of a conveyor belt.

FIG. 6 is a cross-section along a vertical plane of an example of a use of a washer 1', according to the present disclosure, applied to a screwed assembly formed of the upper plate PS of the conveyor belt junction, the end E of the conveyor belt and the lower plate PI of the conveyor belt junction.

In this cross-section, one can in particular see the conical surface 17 of the washer 1' shown by a line that is inclined with respect to the general plane of the washer 1', the screw head 2, the bowl 7 and the central hole 7', the rounded edge 11, the screw stem 8, the upper plate PS of the junction, the end E, of the conveyor belt, the insert 13, and the lower plate PI of the junction. The enlargement of the zone comprising the rounded edge 11 surrounded by a circle in FIG. 6, makes it possible to observe said rounded edge 11 better.

Figure 7:
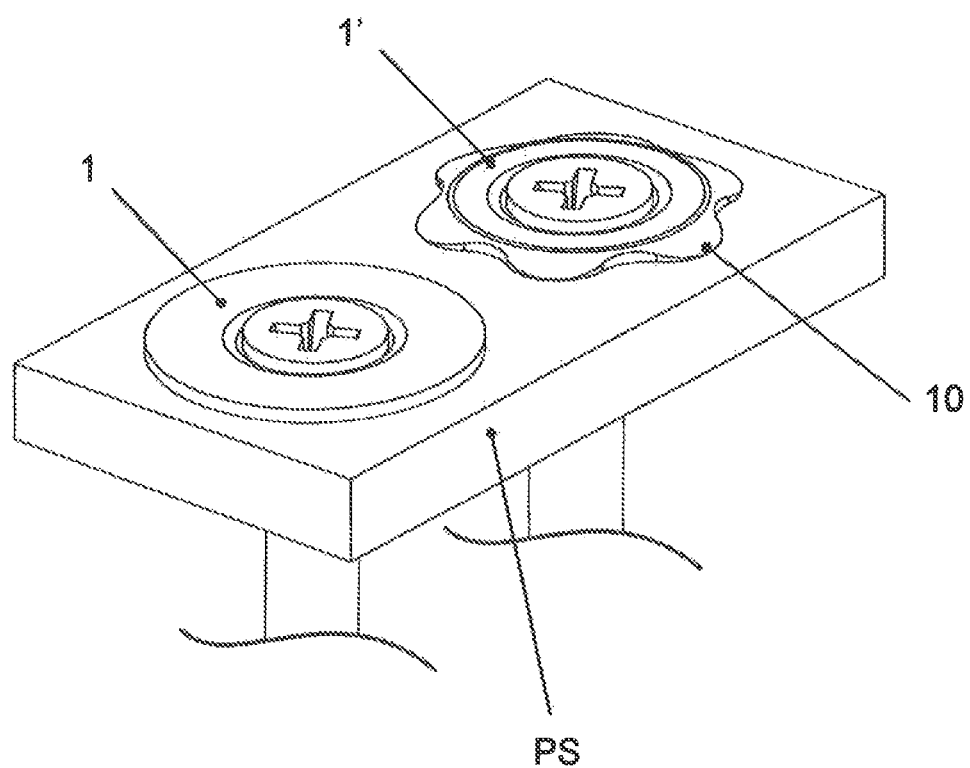
FIG. 7 shows on the left a known washer and on the right a washer according to the present disclosure, applied on an upper plate of a conveyor belt junction.

Note in FIG. 7 that the end of the elevations 10 of the washer 1' on the right is flush with the surface of the upper plate PS of the junction for a conveyor belt. The rounded edge 11 (not visible in FIG. 7) of the lower edge 5 of the elevation 10 made it possible to not shear the material of the upper plate PS during screwing despite the slight sinking that occurs at the end of screwing. As such the scrapers mentioned hereinabove do not risk encountering the upper edge of the elevation 10 and pulling of the washer 1', and because of this, the screw. On the contrary, the washer 1 on the left exceeds the upper surface of the upper plate PS, and if this is screwed more tightly in order to sink the washer, the absence of a rounded edge on the periphery provokes a shearing of the underlying material as soon as it is screwed and then accentuates it, during the operation of the conveyor belt.

The washer 1', according to the present disclosure, as such achieves all of the initially sought purposes, namely inhibiting the shearing effect and not giving hold to scrapers. The means used to achieve these purposes are described and illustrated. The following claims disclose the characteristics of the washers 1' according to the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A supporting washer for a screwed or riveted assembly for a conveyor belt junction element, the supporting washer comprising:
   a central hole for receiving a connecting element comprising a stem and a head for supporting edges of the central hole;
   an outer edge including sinuosities comprising elevations and depressions, the elevations located further from a geometric center of the washer than the depressions in such a way that the outer edge has a linear shape that increases a length of the outer edge;
   a lower edge formed between a lower surface of the washer and the outer edge, said lower edge having a rounded edge on at least the elevations of the sinuosities of the outer edge; and
   an upper conical surface starting from an edge of a bowl surrounding the central hole or from a circular surface surrounding the central hole and terminating at the outer edge, the upper conical surface driving a progressive tapering of the washer such that an upper edge of the outer edge is flush with a surface of the junction whereon the washer is placed when the washer has been applied by riveting or screwing.

2. The supporting washer of claim 1, wherein the elevations and the depressions of the sinuosities of the outer edge have a symmetrical shape with respect to a virtual radius starting from the geometric center of the washer.

3. The supporting washer of claim 1, wherein the supporting washer is made of a metal or a synthetic material.

4. The supporting washer of claim 1, wherein the connecting element is a rivet.

5. The supporting washer of claim 1, wherein the connecting element is a screw comprising a male or female thread.

* * * * *